(12) United States Patent
Beckhardt et al.

(10) Patent No.: US 10,181,323 B2
(45) Date of Patent: Jan. 15, 2019

(54) ARBITRATION-BASED VOICE RECOGNITION

(71) Applicant: Sonos, Inc., Santa Barbara, CA (US)

(72) Inventors: Steven Beckhardt, Boston, MA (US); Ted Lin, Ayer, MA (US)

(73) Assignee: SONOS, INC., Santa Barbara, CA (US)

( * ) Notice: Subject to any disclaimer, the term of this patent is extended or adjusted under 35 U.S.C. 154(b) by 0 days.

(21) Appl. No.: 15/297,627

(22) Filed: Oct. 19, 2016

(65) Prior Publication Data
US 2018/0108351 A1 Apr. 19, 2018

(51) Int. Cl.
G10L 21/00 (2013.01)
G10L 15/22 (2006.01)
G06F 3/16 (2006.01)
G10L 15/32 (2013.01)
G10L 15/08 (2006.01)
H04R 27/00 (2006.01)
G10L 15/30 (2013.01)

(52) U.S. Cl.
CPC ............. G10L 15/22 (2013.01); G06F 3/165 (2013.01); G06F 3/167 (2013.01); G10L 15/32 (2013.01); G10L 15/30 (2013.01); G10L 2015/088 (2013.01); G10L 2015/223 (2013.01); H04R 27/00 (2013.01); H04R 2227/003 (2013.01); H04R 2227/005 (2013.01)

(58) Field of Classification Search
CPC ................................ G10L 15/22; G06F 3/165
USPC .......................................................... 704/275
See application file for complete search history.

(56) References Cited

U.S. PATENT DOCUMENTS

| 4,741,038 | A | 4/1988 | Elko et al. |
|---|---|---|---|
| 4,941,187 | A | 7/1990 | Slater |
| 5,440,644 | A | 8/1995 | Farinelli et al. |
| 5,588,065 | A | 12/1996 | Tanaka et al. |
| 5,740,260 | A | 4/1998 | Odom |
| 5,761,320 | A | 6/1998 | Farinelli et al. |
| 5,923,902 | A | 7/1999 | Inagaki |
| 6,032,202 | A | 2/2000 | Lea et al. |
| 6,088,459 | A | 7/2000 | Hobelsberger |
| 6,256,554 | B1 | 7/2001 | Dilorenzo |
| 6,301,603 | B1 | 10/2001 | Maher et al. |
| 6,311,157 | B1 | 10/2001 | Strong |

(Continued)

FOREIGN PATENT DOCUMENTS

| AU | 2017100486 A4 | 6/2017 |
|---|---|---|
| AU | 2017100581 A4 | 6/2017 |

(Continued)

OTHER PUBLICATIONS

US 9,299,346, 03/2016, Hart et al. (withdrawn)

(Continued)

Primary Examiner — Jakieda R Jackson

(57) ABSTRACT

A first voice input is detected and a first measure of confidence associated with the first voice input is determined. A message is received comprising a second measure of confidence associated with detection of the first voice input by a network device. A determination is made whether the first measure of confidence is greater than the second measure of confidence. Based on the determination that the first measure of confidence is greater than the second measure of confidence, a second voice input is sent to a server.

20 Claims, 11 Drawing Sheets

(56) References Cited

U.S. PATENT DOCUMENTS

| | | |
|---|---|---|
| 6,404,811 B1 | 6/2002 | Cvetko et al. |
| 6,408,078 B1 | 6/2002 | Hobelsberger |
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,611,604 B1 | 8/2003 | Irby et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,961,892 B2 | 6/2011 | Fedigan |
| 7,987,294 B2 | 7/2011 | Bryce et al. |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,284,982 B2 | 10/2012 | Bailey |
| 8,290,603 B1 | 10/2012 | Lambourne |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,483,853 B1 | 7/2013 | Lambourne |
| 8,484,025 B1 | 7/2013 | Moreno et al. |
| 8,831,761 B2 | 9/2014 | Kemp et al. |
| 8,831,957 B2 | 9/2014 | Taubman et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,042,556 B2 | 5/2015 | Kallai et al. |
| 9,094,539 B1 | 7/2015 | Noble |
| 9,215,545 B2 | 12/2015 | Dublin et al. |
| 9,251,793 B2 | 2/2016 | Lebeau et al. |
| 9,253,572 B2 | 2/2016 | Bedingfield, Sr. et al. |
| 9,262,612 B2 | 2/2016 | Cheyer |
| 9,288,597 B2 | 3/2016 | Carlsson et al. |
| 9,300,266 B2 | 3/2016 | Grokop |
| 9,307,321 B1 | 4/2016 | Unruh |
| 9,318,107 B1 | 4/2016 | Sharifi |
| 9,319,816 B1 | 4/2016 | Narayanan |
| 9,335,819 B1 * | 5/2016 | Jaeger ............... G06F 3/013 |
| 9,368,105 B1 | 6/2016 | Freed et al. |
| 9,374,634 B2 | 6/2016 | Macours |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,510,101 B1 | 11/2016 | Polleros |
| 9,514,752 B2 | 12/2016 | Sharifi |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,576,591 B2 | 2/2017 | Kim |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,811,314 B2 | 11/2017 | Plagge et al. |
| 9,813,810 B1 | 11/2017 | Nongpiur |
| 9,813,812 B2 | 11/2017 | Berthelsen et al. |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn |
| 9,881,616 B2 | 1/2018 | Beckley et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 | 2/2003 | Yang et al. |
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0157951 A1 | 8/2003 | Hasty |
| 2004/0024478 A1 | 2/2004 | Hans et al. |
| 2004/0093219 A1 | 5/2004 | Shin et al. |
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0164664 A1 | 7/2005 | DiFonzo et al. |
| 2005/0195988 A1 | 9/2005 | Tashev et al. |
| 2005/0207584 A1 | 9/2005 | Bright |
| 2005/0268234 A1 | 12/2005 | Rossi et al. |
| 2005/0283330 A1 | 12/2005 | Laraia et al. |
| 2006/0104451 A1 | 5/2006 | Browning et al. |

(56) References Cited

U.S. PATENT DOCUMENTS

| | | |
|---|---|---|
| 2006/0147058 A1 | 7/2006 | Wang |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2008/0037814 A1 | 2/2008 | Shau |
| 2008/0090537 A1 | 4/2008 | Sutardja |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0153289 A1* | 6/2009 | Hope ................. G06F 3/04883 |
| | | 340/5.1 |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0264072 A1 | 10/2009 | Dai |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1 | 2/2010 | Franco et al. |
| 2010/0075723 A1 | 3/2010 | Min et al. |
| 2010/0092004 A1 | 4/2010 | Kuze |
| 2010/0172516 A1 | 7/2010 | Lastrucci |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0035580 A1* | 2/2011 | Wang ..................... H04L 63/12 |
| | | 713/151 |
| 2011/0044489 A1 | 2/2011 | Saiki et al. |
| 2011/0091055 A1 | 4/2011 | Leblanc |
| 2011/0145581 A1 | 6/2011 | Malhotra et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0289506 A1* | 11/2011 | Trivi ..................... G06F 9/526 |
| | | 718/104 |
| 2011/0299706 A1 | 12/2011 | Sakai |
| 2012/0078635 A1 | 3/2012 | Rothkopf et al. |
| 2012/0123268 A1 | 5/2012 | Tanaka et al. |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0297284 A1 | 11/2012 | Matthews et al. |
| 2012/0308044 A1 | 12/2012 | Vander et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0039527 A1 | 2/2013 | Jensen et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0198298 A1 | 8/2013 | Li et al. |
| 2013/0216056 A1 | 8/2013 | Thyssen |
| 2013/0317635 A1 | 11/2013 | Bates et al. |
| 2013/0322665 A1* | 12/2013 | Bennett ............ G08G 1/096855 |
| | | 381/300 |
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0343567 A1 | 12/2013 | Triplett et al. |
| 2014/0003611 A1 | 1/2014 | Mohammad et al. |
| 2014/0003635 A1 | 1/2014 | Mohammad et al. |
| 2014/0006026 A1 | 1/2014 | Lamb et al. |
| 2014/0034929 A1 | 2/2014 | Hamada et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0145168 A1 | 5/2014 | Ohsawa et al. |
| 2014/0167931 A1 | 6/2014 | Lee et al. |
| 2014/0195252 A1 | 7/2014 | Gruber et al. |
| 2014/0244013 A1 | 8/2014 | Reilly |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0277650 A1 | 9/2014 | Zurek et al. |
| 2014/0278416 A1* | 9/2014 | Schuster .................. G10L 17/00 |
| | | 704/246 |
| 2014/0291642 A1 | 10/2014 | Watabe et al. |
| 2014/0340888 A1 | 11/2014 | Ishisone et al. |
| 2014/0363022 A1 | 12/2014 | Dizon et al. |
| 2014/0369491 A1 | 12/2014 | Kloberdans et al. |
| 2014/0372109 A1 | 12/2014 | Iyer et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0036831 A1 | 2/2015 | Klippel |
| 2015/0063580 A1 | 3/2015 | Huang et al. |
| 2015/0086034 A1 | 3/2015 | Lombardi et al. |
| 2015/0104037 A1 | 4/2015 | Lee et al. |
| 2015/0106085 A1 | 4/2015 | Lindahl |
| 2015/0110294 A1* | 4/2015 | Chen ...................... H03G 7/002 |
| | | 381/106 |
| 2015/0154976 A1 | 6/2015 | Mutagi |
| 2015/0169279 A1* | 6/2015 | Duga ..................... G09B 19/04 |
| | | 700/94 |
| 2015/0170645 A1 | 6/2015 | Di Censo et al. |
| 2015/0180432 A1 | 6/2015 | Gao et al. |
| 2015/0181318 A1 | 6/2015 | Gautama et al. |
| 2015/0189438 A1 | 7/2015 | Hampiholi |
| 2015/0200454 A1 | 7/2015 | Heusdens et al. |
| 2015/0221678 A1 | 8/2015 | Yamazaki et al. |
| 2015/0222987 A1 | 8/2015 | Angel, Jr. et al. |
| 2015/0228274 A1 | 8/2015 | Leppänen et al. |
| 2015/0228803 A1 | 8/2015 | Koezuka et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0263174 A1 | 9/2015 | Yamazaki et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0338917 A1* | 11/2015 | Steiner .................. H04L 9/3231 |
| | | 345/156 |
| 2015/0341406 A1 | 11/2015 | Rockefeller et al. |
| 2015/0346845 A1 | 12/2015 | Di Censo et al. |
| 2015/0363061 A1 | 12/2015 | De Nigris, III et al. |
| 2015/0363401 A1 | 12/2015 | Chen et al. |
| 2015/0371657 A1 | 12/2015 | Gao et al. |
| 2015/0380010 A1 | 12/2015 | Srinivasan, Sr. et al. |
| 2016/0007116 A1 | 1/2016 | Holman |
| 2016/0021458 A1 | 1/2016 | Johnson et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0057522 A1 | 2/2016 | Choisel et al. |
| 2016/0077710 A1 | 3/2016 | Lewis et al. |

(56) References Cited

U.S. PATENT DOCUMENTS

| | | |
|---|---|---|
| 2016/0088392 A1 | 3/2016 | Huttunen et al. |
| 2016/0093304 A1 | 3/2016 | Kim et al. |
| 2016/0094917 A1 | 3/2016 | Wilk et al. |
| 2016/0098393 A1 | 4/2016 | Hebert |
| 2016/0111110 A1 | 4/2016 | Gautama et al. |
| 2016/0134982 A1 | 5/2016 | Iyer |
| 2016/0155443 A1 | 6/2016 | Khan et al. |
| 2016/0157035 A1 | 6/2016 | Russell et al. |
| 2016/0173578 A1 | 6/2016 | Sharma et al. |
| 2016/0173983 A1 | 6/2016 | Berthelsen et al. |
| 2016/0189716 A1 | 6/2016 | Lindahl et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0302018 A1 | 10/2016 | Russell et al. |
| 2016/0314782 A1 | 10/2016 | Klimanis |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353218 A1 | 12/2016 | Starobin et al. |
| 2016/0366515 A1 | 12/2016 | Mendes et al. |
| 2016/0372688 A1 | 12/2016 | Seo et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0083285 A1* | 3/2017 | Meyers .......... G10L 15/063 |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092889 A1 | 3/2017 | Seo et al. |
| 2017/0092890 A1 | 3/2017 | Seo et al. |
| 2017/0103755 A1 | 4/2017 | Jeon et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0140748 A1* | 5/2017 | Roberts .......... G10L 13/04 |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0188150 A1 | 6/2017 | Brunet et al. |
| 2017/0193999 A1 | 7/2017 | Aleksic et al. |
| 2017/0206896 A1 | 7/2017 | Ko et al. |
| 2017/0214996 A1 | 7/2017 | Yeo |
| 2017/0236512 A1* | 8/2017 | Williams .......... G10L 15/22 |
| 2017/0242651 A1 | 8/2017 | Lang et al. |
| 2017/0242653 A1 | 8/2017 | Lang et al. |
| 2017/0257686 A1 | 9/2017 | Gautama et al. |
| 2017/0270919 A1 | 9/2017 | Parthasarathi et al. |
| 2017/0287485 A1 | 10/2017 | Civelli et al. |
| 2017/0353789 A1 | 12/2017 | Kim et al. |
| 2018/0033428 A1 | 2/2018 | Kim et al. |
| 2018/0040324 A1 | 2/2018 | Wilberding |
| 2018/0130469 A1 | 5/2018 | Gruenstein et al. |

FOREIGN PATENT DOCUMENTS

| | | |
|---|---|---|
| CN | 103546616 A | 1/2014 |
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| KR | 20100111071 A | 10/2010 |
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016014142 A1 | 1/2016 |
| WO | 2016033364 A1 | 3/2016 |
| WO | 2016057268 A1 | 4/2016 |
| WO | 2017039632 A1 | 3/2017 |

OTHER PUBLICATIONS

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
"Denon 2003-2004 Product Catalog," Denon, 2003-2004, 44 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Searching Authority, International Search Report and Written Opinion dated Jan. 23, 2018, issued in connection with International Application No. PCT/US2017/57220, filed on Oct. 18, 2017, 8 pages.
Non-Final Office Action dated May 9, 2018, issued in connection with U.S. Appl. No. 15/818,051, filed Nov. 20, 2017, 22 pages.

(56) References Cited

OTHER PUBLICATIONS

Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Aug. 1, 2018, issued in connection with U.S. Appl. No. 15/297,627, filed Oct. 19, 2016, 9 pages.
Notice of Allowance dated Apr. 11, 2018, issued in connection with U.S. Appl. No. 15/719,454, filed Sep. 28, 2017, 15 pages.
Notice of Allowance dated Jul. 12, 2017, issued in connection with U.S. Appl. No. 15/098,805, filed Apr. 14, 2016, 8 pages.
Notice of Allowance dated Sep. 12, 2018, issued in connection with U.S. Appl. No. 15/438,744, filed Feb. 21, 2017, 15 pages.
Notice of Allowance Dated Dec. 13, 2017, issued in connection with U.S. Appl. No. 15/784,952, filed Oct. 16, 2017, 9 pages.
Notice of Allowance dated Aug. 14, 2017, issued in connection with U.S. Appl. No. 15/098,867, filed Apr. 14, 2016, 10 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
Notice of Allowance dated Dec. 15, 2017, issued in connection with U.S. Appl. No. 15/223,218, filed Jul. 29, 2016, 7 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Sep. 17, 2018, issued in connection with U.S. Appl. No. 15/211,689, filed Jul. 15, 2016, 6 pages.
Notice of Allowance dated Jul. 19, 2018, issued in connection with U.S. Appl. No. 15/681,937, filed Aug. 21, 2017, 7 pages.
Notice of Allowance dated Mar. 20, 2018, issued in connection with U.S. Appl. No. 15/784,952, filed Oct. 16, 2017, 7 pages.
Notice of Allowance dated Sep. 20, 2018, issued in connection with U.S. Appl. No. 15/946,599, filed Apr. 5, 2018, 7 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Notice of Allowance dated Jul. 30, 2018, issued in connection with U.S. Appl. No. 15/098,718, filed Apr. 14, 2016, 5 pages.
Notice of Allowance dated Oct. 5, 2018, issued in connection with U.S. Appl. No. 15/211,748, filed Jul. 15, 2018, 10 pages.
Notice of Allowance dated Aug. 9, 2018, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Restriction Requirement dated Aug. 9, 2018, issued in connection with U.S. Appl. No. 15/717,621, filed Sep. 27, 2017, 8 pages.
Tsiami et al. "Experiments in acoustic source localization using sparse arrays in adverse indoors environments", 2014 22nd European Signal Processing Conference, Sep. 1, 2014, 5 pages.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Kiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Advisory Action dated Jun. 28, 2018, issued in connection with U.S. Appl. No. 15/438,744, filed Feb. 21, 2017, 3 pages.
Corrected Notice of Allowability dated Mar. 8, 2017, issued in connection with U.S. Appl. No. 15/229,855, filed Aug. 5, 2016, 6 pages.

European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pags.
Final Office Action dated Aug. 11, 2017, issued in connection with U.S. Appl. No. 15/131,776, filed Apr. 18, 2016, 7 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated Jun. 15, 2017, issued in connection with U.S. Appl. No. 15/098,718, filed Apr. 14, 2016, 15 pages.
Final Office Action dated Oct. 15, 2018, issued in connection with U.S. Appl. No. 15/804,776, filed Nov. 6, 2017, 18 pages.
Final Office Action dated Oct. 16, 2018, issued in connection with U.S. Appl. No. 15/438,725, filed Feb. 21, 2017, 10 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Bureau, International Preliminary Report on Patentability, dated Sep. 7, 2018, issued in connection with International Application No. PCT/US2017/018728, filed Feb. 21, 2017, 8 pages.
International Bureau, International Preliminary Report on Patentability, dated Sep. 7, 2018, issued in connection with International Application No. PCT/US2017/018739, filed Feb. 21, 2017, 7 pages.
International Searching Authority, International Search Report and Written Opinion dated Nov. 22, 2017, issued in connection with International Application No. PCT/US2017/054063, filed Sep. 28, 2017, 11 pages.
International Searching Authority, International Search Report and Written Opinion dated May 23, 2017, issued in connection with International Application No. PCT/US2017/018739, filed Feb. 21, 2017, 10 pages.
International Searching Authority, International Search Report and Written Opinion dated Oct. 23, 2017, issued in connection with International Application No. PCT/US2017/042170, filed Jul. 14, 2017, 15 pages.
International Searching Authority, International Search Report and Written Opinion dated Oct. 24, 2017, issued in connection with International Application No. PCT/US2017/042227, filed Jul. 14, 2017, 16 pages.
International Searching Authority, International Search Report and Written Opinion dated May 30, 2017, issued in connection with International Application No. PCT/US2017/018728, filed Feb. 21, 2017, 11 pages.
Morales-Cordovilla et al. "Room Localization for Distant Speech Recognition," Proceedings of Interspeech 2014, Sep. 14, 2014, 4 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21. 2017, 11 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438725, filed Feb. 21, 2017, 15 pages.
Non-Final Office Action dated Sep. 10, 2018, issued in connection with U.S. Appl. No. 15/670,361, filed Aug. 7, 2017, 17 pages.

(56) References Cited

OTHER PUBLICATIONS

Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
Non-Final Office Action dated Sep. 14, 2017, issued in connection with U.S. Appl. No. 15/178,180, filed Jun. 9, 2016, 16 pages.
Non-Final Office Action dated Sep. 14, 2018, issued in connection with U.S. Appl. No. 15/959,907, filed Apr. 23. 2018, 15 pages.
Non-Final Office Action dated Mar. 16, 2018, issued in connection with U.S. Appl. No. 15/681,937, filed Aug. 21, 2017, 5 pages.
Non-Final Office Action dated Oct. 16, 2018, issued in connection with U.S. Appl. No. 15/131,254, filed Apr. 18, 2016, 16 pages.
Non-Final Office Action dated Apr. 18, 2018, issued in connection with U.S. Appl. No. 15/811,468 filed Nov. 13, 2017, 14 pages.
Non-Final Office Action dated Apr. 19, 2017, issued in connection with U.S. Appl. No. 15/131,776, filed Apr. 18, 2016, 12 pages.
Non-Final Office Action dated Feb. 20, 2018, issued in connection with U.S. Appl. No. 15/211,748, filed Jul. 15, 2016, 31 pages.
Non-Final Office Action dated May 22, 2018, issued in connection with U.S. Appl. No. 15/946,599, filed Apr. 5, 2018, 19 pages.
Non-Final Office Action dated Jul. 25, 2017, issued in connection with U.S. Appl. No. 15/273,679, filed Jul. 22, 2016, 11 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Jun. 30, 2017, issued in connection with U.S. Appl. No. 15/277,810, filed Sep. 27, 2016, 13 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Apr. 9, 2018, issued in connection with U.S. Appl. No. 15/804,776, filed Nov. 6, 2017, 18 pages.
"Automatic Parameter Tying in Neural Networks" ICLR 2018, 14 pages.
Han et al. "Deep Compression: Compressing Deep Neural Networks with Pruning, Trained Quantization and Huffman Coding." ICLR 2016, Feb. 15, 2016, 14 pages.
Jose Alvarez and Mathieu Salzmann "Compression-aware Training of Deep Networks" 31st Conference on Neural Information Processing Systems, Nov. 13, 2017, 12pages.
Maja Taseska and Emanual A.P. Habets, "MMSE-Based Blind Source Extraction in Diffuse Noise Fields Using a complex Coherence-Based a Priori Sap Estimator." International Workshop on Acoustic Signal Enhancement 2012, Sep. 4-6, 2012, 4pages.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Ullrich et al. "Soft Weight-Sharing for Neural Network Compression." ICLR 2017, 16 pages.

\* cited by examiner

ARBITRATION-BASED VOICE RECOGNITION

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
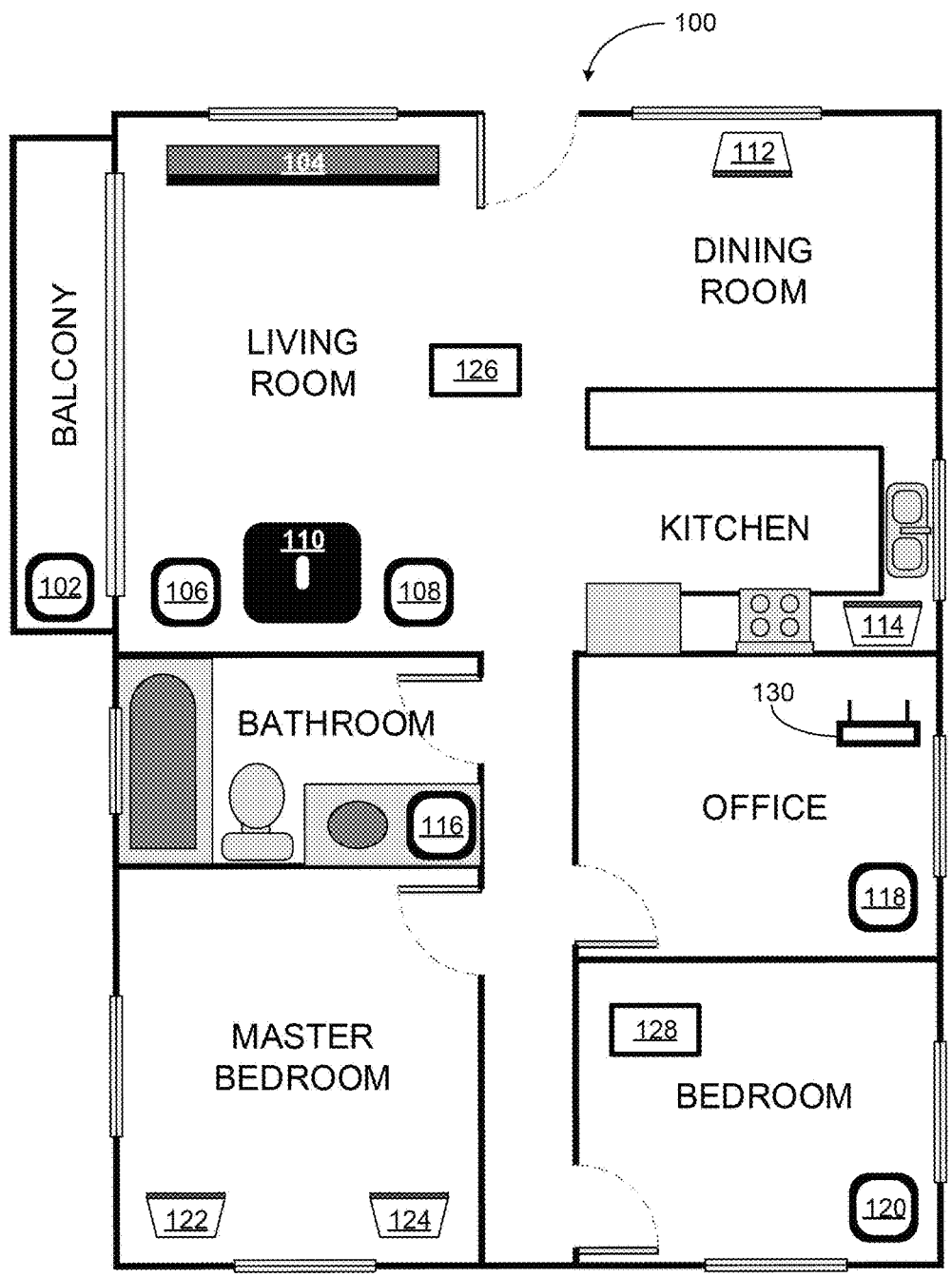
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Listening to media content out loud is a social activity which involves family, friends, and guests. The media content may include, for instance, talk radio, books, audio from television, music stored on a local drive, music from media sources (e.g., Pandora® Radio, Spotify®, Slacker®, Radio, Google Play™, iTunes Radio), and other audible material. For example, people may play music out loud at parties and other social gatherings. Further, the music may be played in one listening zone or multiple listening zones simultaneously, such that the music in each listening zone may be synchronized, without audible echoes or glitches.

A music experience may be enriched when voice inputs are used to control an audio playback device or system, among other devices (e.g., lights). For example, a user may wish to change audio content being played back, a playlist, a playback queue, or a listening zone, add a music track to a playlist or playback queue, or change a playback setting (e.g., play, pause, next track, previous track, playback volume, and EQ settings, among others). The user may provide a voice input associated with control of the audio playback device, among other devices, which is received by a networked microphone device (NMD). The NMD may include a microphone to detect the voice input. An NMD may be, for example, a SONOS® playback device, server, or system capable of receiving voice input via a microphone to control the audio playback device or system, among other devices. Additionally, or alternatively, the NMD may be, for example, an AMAZON® ECHO®, APPLE® IPHONE® device, server, or system capable of receiving voice inputs via a microphone to control the audio playback device or system, among other devices. U.S. application Ser. No. 15/098,867 entitled, "Default Playback Device Designation," the contents of which is hereby incorporated by reference, provides examples of voice-enabled household architectures.

The voice input from the user may be composed of a wakeword followed by a voice command. The wakeword may indicate to the NMD that voice input in the form of the voice command follows. The wakeword may be a spoken voice input such as "Alexa", "OK Google", "Hey Sonos", or "Hey Siri", among other examples. The voice command may be a spoken voice input which indicates to the NMD that control of a media playback device or system, among other devices is requested. Example voice commands may include commands to modify any of the media playback playback settings such as playback volume, playback transport controls, music source selection, and grouping, among other possibilities. Alternatively, the voice command may be a spoken voice input requesting information such as "What is the volume setting?" or "What songs are in the playlist?" Multiple NMDs in a listening range may detect the wakeword and receive the voice command which follows the wakeword.

Embodiments described herein are directed to a method and system for arbitrating which NMD of multiple NMDs may send a voice input (e.g., voice command or wakeword and voice command) to a cloud-based computing device, e.g., server. The NMD may send the voice input to the cloud-based computing device so that the cloud-based computing device can perform voice recognition on the voice input. The voice recognition allows for identification of the requested control or information. For example, the arbitration process avoids having multiple NMDs send a same voice command to the cloud-based computing device, and thereby avoids potentially wasting bandwidth which could otherwise be used for other activities such as playing music.

The arbitration process may begin with the NMD detecting a wakeword. The NMD may identify the wakeword, e.g., whether the wakeword was "Alexa", "OK Google", "Hey Sonos", or "Hey Siri" and also determine a measure of confidence associated with how well the wakeword was detected. The NMD may also be playing back audio content when the wakeword is detected. In this case, the NMD may also adjust the audio being played back by the NMD so that the voice command which follows the wakeword can be clearly received over the audio being played back. The audio may be adjusted in a variety of manners including pausing the audio being played back or ducking the audio being played back.

In some embodiments, the NMD may define a time interval indicative of how long the NMD may wait before determining whether to send the voice command to the cloud-based computing device. The time interval may be a static parameter or a dynamic parameter. The time interval may be selected to balance needs of providing enough time to complete the arbitration described in more detail below and addressing latency concerns.

In some embodiments, the NMD may generate a message also referred to herein as arbitration message which is sent to other NMDs, e.g., in a household. The arbitration message may include one or more of the identifier of the wakeword which was received by the NMD, the measure of confidence of how well the wakeword was detected, and the time interval. Each of the other NMDs that detected the wakeword may send a similar arbitration message associated with detection of the wakeword to other NMDs.

If the NMD receives an arbitration message from another NMD, then the NMD may determine whether it wins the arbitration with the other NMD. The NMD may win the arbitration if the measure of confidence of the wakeword detected by the NMD is greater than that detected by the other NMD as indicated by the received arbitration message. The NMD which has a greater measure of confidence associated with the detected wakeword may be in a better position to clearly receive the voice command which follows the wakeword.

If the NMD loses the arbitration, then the NMD may restore the audio being played back by the NMD. For example, the NMD may unduck or unpause the audio. Alternatively, the audio may not be so adjusted until it is notified by the NMD which wins the arbitration, another NMD in a bonded zone with the NMD, or by the cloud-based computing device.

If the NMD establishes the time interval, the NMD may receive additional arbitration messages from other NMDs until the time interval expires. The NMD may perform arbitration on these additional arbitration messages. If the NMD continues to win arbitrations, then the NMD may send the received voice command to the cloud-based computing device when the time interval expires. The cloud-based computing device may perform voice recognition on the voice command. For example, the cloud-based computing device may convert the voice command to text, interpret the text, and then formulate a response based on the text. If the voice command is a request for information, then the response may be the requested information sent to the NMD in the form of text and converted to a voice response that is audibly played back by the NMD. Additionally, or alternatively, if the voice command is associated with control of a media playback system or device, then the response may be a command associated with the control of a media playback device or system such as play certain music content or change a setting of the playback device. The server may send the command to the NMD and the NMD may perform the command or instruct another network device to perform the command.

In some embodiments, arbitration may be performed by a centralized device rather than being performed locally at each NMD. The centralized device may be a designated NMD or other network device on a local area network. The centralized device may be arranged to determine which NMD of one or more NMDs which detected a wakeword should send the voice command following the wakeword to the cloud-based computing device. In this regard, the centralized device may receive an arbitration message from the one or more NMDs and identify based on the measure of confidence associated with the arbitration message which NMD should send its received voice command to the cloud-based computing device. For example, the centralized device may determine which NMD detected the wakeword with a largest measure of confidence. The centralized device may then cause the identified NMD to send the received voice command to the cloud-based computing device.

Moving on from the above illustration, an example embodiment includes a first network device comprising a processor; memory; and computer instructions stored in the memory and executable by the processor to cause the processor to: detect a first voice input; determine a first measure of confidence associated with the first voice input; receive a message, wherein the message comprises a second measure of confidence associated with detection of the first voice input by a second network device; determine whether the first measure of confidence is greater than the second measure of confidence; and based on the determination that the first measure of confidence is greater than the second measure of confidence, send a second voice input to a server. The first network device may further comprise computer instructions for adjusting a volume of audio playback in response to detecting the first voice input. The first network device may further comprise computer instructions for determining that the audio playback is music playback, and where adjusting the volume of the audio playback in response to detecting the first voice input comprises ducking the music playback. The first network device may further comprise computer instructions for determining that the audio playback is playback of an audio book, and where adjusting the volume of the audio playback in response to detecting the first voice input comprises pausing the playback of the audio book. The first network device may further comprise computer instructions for receiving a notification to return the volume of the audio playback to a volume setting before adjustment. The message may be a first message. The first network device may further comprise computer instructions for sending a second message which comprises the first measure of the confidence associated with the detected first voice input to the second network device. The first network device may further comprise computer instructions for waiting for expiration of a timer before sending the second voice input to the server. The response may be a voice response. The first network device may further comprise computer instructions for audibly playing the voice response. The first voice input may be a wakeword and the second voice input may be a voice command. The first voice input may be the same as the second voice input.

Another example embodiment may include a method comprising: detecting a first voice input; determining a first measure of confidence associated with the first voice input; receiving a message, wherein the message comprises a second measure of confidence associated with detection of the first voice input by a network device; determining whether the first measure of confidence is greater than the second measure of confidence; and based on the determination that the first measure of confidence is greater than the second measure of confidence, sending a second voice input to a server. The method may further comprise adjusting a volume of audio playback in response to detecting the voice input. The method may further comprise determining that the audio playback is music playback, and where adjusting the volume of the audio playback in response to detecting the voice input comprises ducking the music playback. The method may further comprise determining that the audio playback is playback of an audio book, and where adjusting the volume of the audio playback in response to detecting the voice input comprises pausing the playback of the audio book. The method may further comprise receiving a notification to return the volume of the audio playback to a volume setting before adjustment. The method may further comprise waiting for expiration of a timer before sending the second voice input to the server. The method may further comprise audibly playing the voice response. The message may be a first message. The method may further comprise sending a second message which comprises the first measure of the confidence associated with the detected first voice input to the network device. The first voice input may be a wakeword and the second voice input may be voice command.

Yet another example embodiment may include a tangible non-transitory computer readable storage medium including instructions for execution by a processor, the instructions, when executed, cause the processor to implement a method comprising: detecting a first voice input; determining a first measure of confidence associated with the first voice input; receiving a message, wherein the message comprises a second measure of confidence associated with detection of the first voice input by a network device; determining whether the first measure of confidence is greater than the second measure of confidence; and based on the determination that the first measure of confidence is greater than the second measure of confidence, sending a second voice input to a server.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments. Moreover, the examples described herein may extend to a multitude of embodiments formed by combining the example features in any suitable manner.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
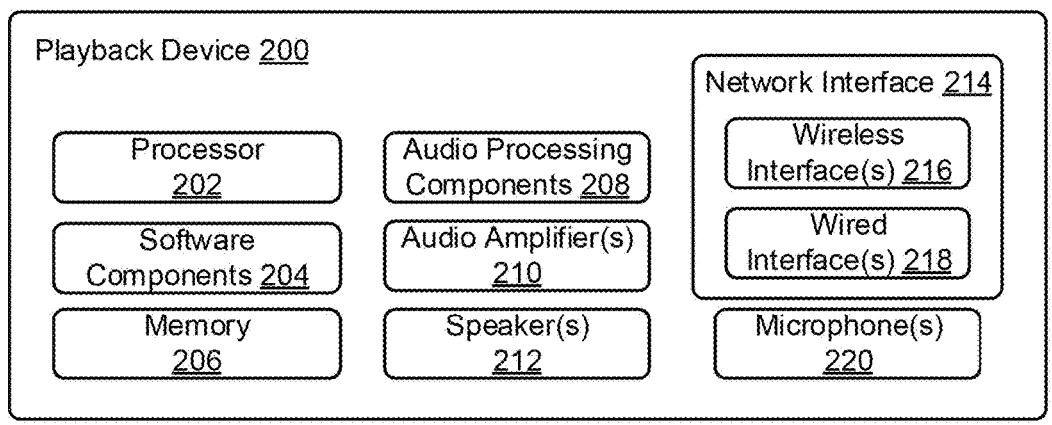
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not include the microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
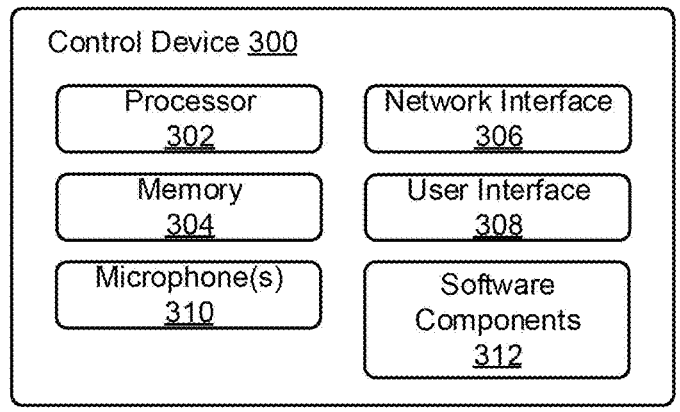
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
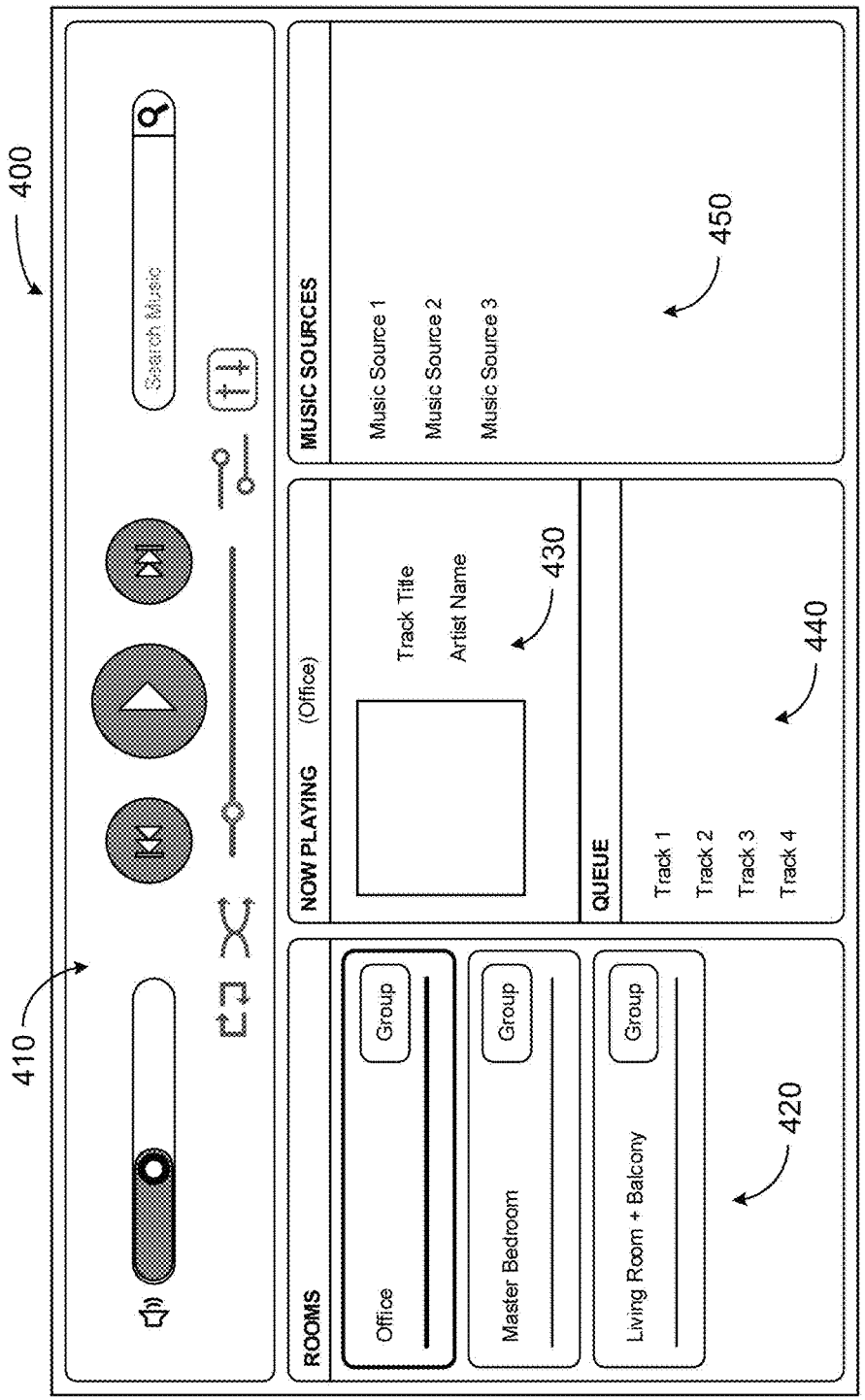
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
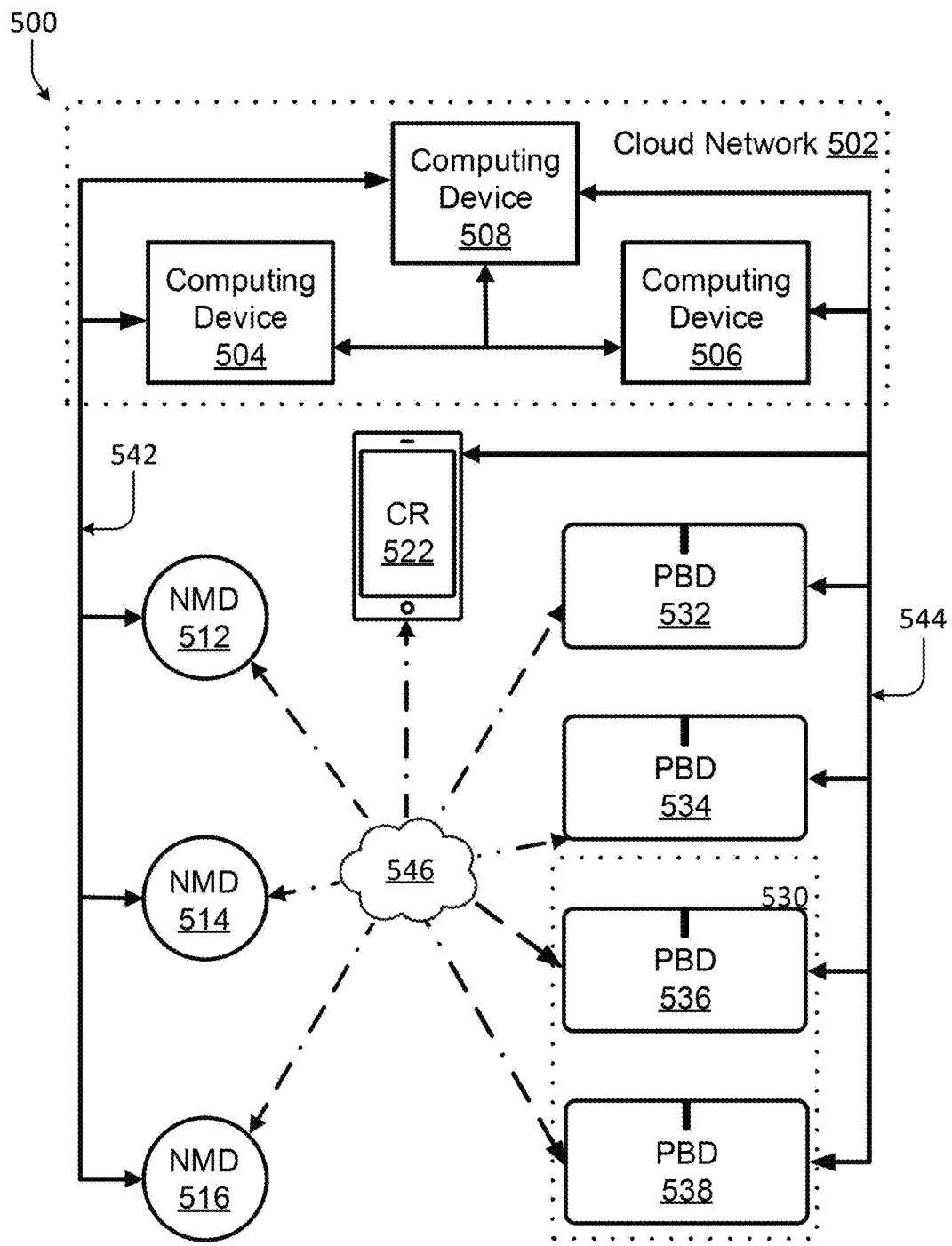
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, a single access point may include communication paths 542 and 544. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
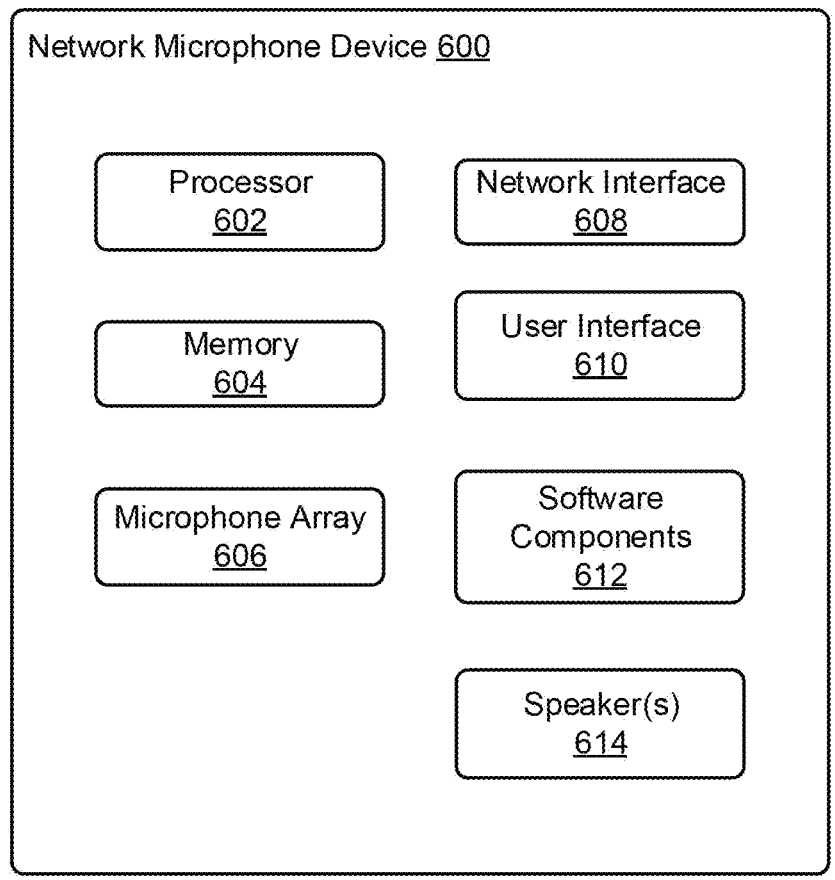
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614. In this case, the NMD 600 may also includes the functions and features associated with the playback device 200.

III. Example Systems and Methods for Arbitration-Based Voice Recognition

A plurality of NMDs may be communicatively coupled via the communication means 546. One or more of the plurality of NMDs may detect a wakeword associated with a voice command spoken by a speaker. The voice command may be a request for information such as "What is the volume setting?" or "What songs are in the playlist?" Alternatively, the voice commands may include commands to modify any of media playback playback settings such as playback volume, playback transport controls, music source selection, and grouping, among other possibilities. As more household devices become "smart" (e.g., by incorporating a network interface), voice commands may be used to control household devices other than media playback devices. The voice command may take other forms as well.

Embodiments described herein are directed to a method and system for arbitrating which NMD of multiple NMDs may send a voice input (e.g., voice command or wakeword and voice command) to a cloud-based computing device, e.g., server. The NMD may send the voice input to the cloud-based computing device so that the cloud-based computing device can perform voice recognition on the voice input. The voice recognition allows for identification of the requested control or information. For example, the arbitration process avoids having multiple NMDs send a same voice command to the cloud-based computing device, and thereby avoids potentially wasting bandwidth which could otherwise be used for other activities such as playing music.

Generally, it should be understood that one or more functions described herein may be performed by the NMD individually or in combination with the computing device 504-506, PBDs 532-538, NMDs 512-516, CR 522, or any other devices described herein.

Figure 7:
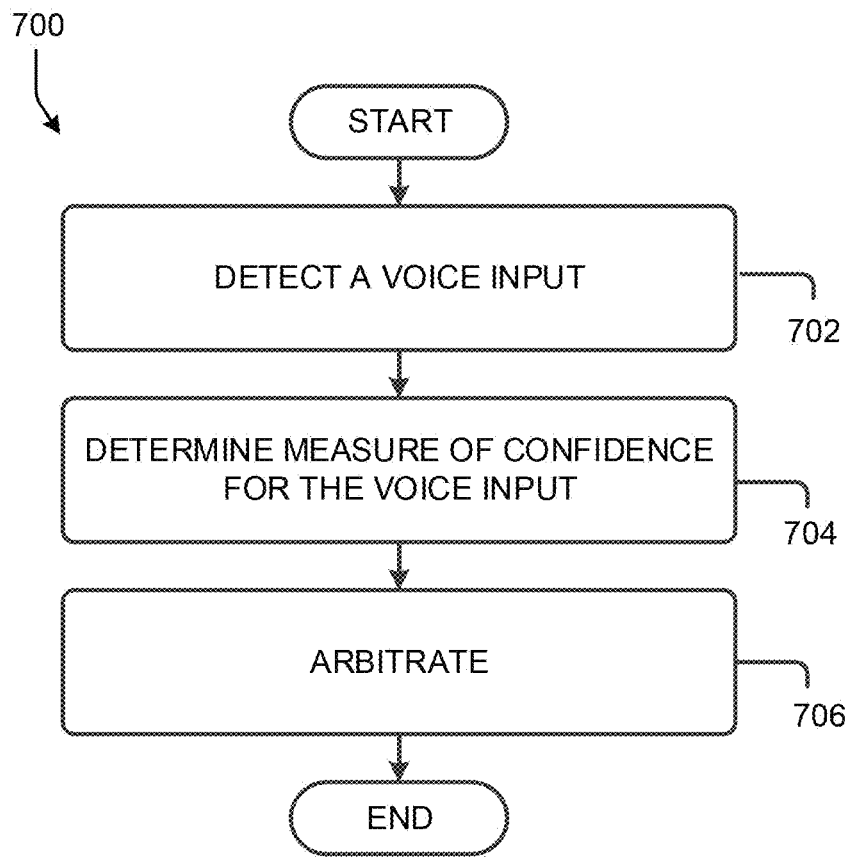
FIG. 7 shows a simplified flow diagram of functions associated with arbitration between network microphone devices.

Implementation 700 shown in FIG. 7 presents an embodiment of example techniques described herein. Briefly, at 702, a voice input may be detected. At 704, a measure of confidence may be determined for the voice input. At 706, an arbitration process may be performed. The arbitration process may involve determining whether the NMD is to send a received voice command or a received voice command and the voice input to a server for voice recognition. Multiple NMDs in the household may perform the functions described in FIG. 7.

Implementation 700 can be implemented within an operating environment including or involving, for example, the one or more NMDs 512-516 in the configuration shown in FIG. 5. The one or more of blocks 702-706 may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementation 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 700 and other processes and methods disclosed herein, each block in FIG. 7 may represent circuitry that is wired to perform the specific logical functions in the process.

Referring back to FIG. 7, at 702, the voice input may be detected. For example, an NMD may have one or more microphones to receive the voice input. In some embodiments, the voice input may take the form of the wakeword. The wakeword may be a spoken voice input such as "Alexa", "OK Google", "Hey Sonos", or "Hey Siri", among other examples.

The wakeword may be an indication for the NMD to "wake up" and start receiving a voice input which follows the wakeword. The voice input may be a voice command that is received by the NMD. The NMD may store a voice recording of the received voice command, e.g., in a ring or circular buffer, as the voice command is received. In this regard, the voice recording may be discarded unless the NMD sends the received voice command to the server for processing. The ring or circular buffer may be stored locally and/or remotely via any of the devices or servers described herein.

In some instances, NMD may also adjust audio being played back by the NMD so that the voice command which follows the wakeword is clearly received. The audio may be adjusted in a variety of manners. In one embodiment, the audio may be ducked. Ducking may involve lowering the volume of the audio, for example to a volume proportional to a volume of the detected wakeword. In another embodiment, the audio may be paused. Whether the audio is ducked or paused may depend on a type of the audio and a desired user experience. The NMD may determine the type of audio based on an indicator associated with the audio. For example, the NMD may duck audio in the form of music and the NMD may pause audio in the form of an audio book or podcast. In another example, and as explained further below, audio may be ducked or paused depending on an available processing power of the NMD. Other arrangements are also possible.

The NMD may adjust the audio itself. Additionally, or alternatively, the NMD may adjust the audio played back by audio playback devices in a bonded zone with the NMD, e.g., devices playing audio in stereo. For example, a notification may be sent to the bonded audio playback devices. In some instances, the notification may take the form of a Universal Plug and Play (UPnP) control request.

In some embodiments, the detection of the voice input may also trigger the start of a time interval indicative of how long the NMD waits before sending the received voice command to the server. At one extreme, the NMD may send the voice command as soon as the wakeword is detected. Minimal latency in voice recognition is introduced but arbitration might need to be performed by the server as between two or more NMDs which send a voice command. At another extreme, the NMD may send the voice command after a long time interval, e.g., 100 ms. The long time interval may permit sufficient time to arbitrate, but significant latency is introduced into the voice recognition. Accordingly, the selection of the time interval may balance interests of providing enough time to perform arbitration and minimizing latency in voice recognition.

In some embodiments, the time interval may be the same for all NMDs. In other embodiments, the time interval may be locally determined. For example, the time interval may be based on a number of NMDs connected to communication means 546. The time interval may be set longer if there are more NMDs connected to the communication means 546 and set shorter if there are less NMDs connected to the communication means 546. More NMDs may mean it takes longer for NMDs to communicate with each other to perform the arbitration and less NMDs may mean that it takes less time for NMDs to communicate with each other to perform the arbitration.

For example, the time interval may be set based on a proximity of NMDs to each other. The closer the NMDs are to each other, the shorter the time interval. Conversely, the further apart the NMDs are, the longer the time interval. Closer NMDs may mean it takes less time for NMDs to communicate with each other to perform the arbitration and NMDs spaced further apart may mean that it takes more time for NMDs to communicate with each other to perform the arbitration.

For example, the time interval may be set based on whether the NMDs are wired or wirelessly connected to each other. Wired connections may result in setting a shorter time interval to perform arbitration because the wired connection may be more reliable and require less retransmissions. Wireless connections may result in setting a longer time interval to perform arbitration because the wireless connections may be less reliable and require more retransmissions.

For example, the time interval may be set based on a type of network that connects the NMDs to each other, e.g., a WiFi network or a propriety network such as SonosNet. Networks with fewer number of hops between NMDs may result in setting a shorter time interval to perform arbitration. Conversely, networks with larger number of hops between NMDs may result in setting a longer time interval to perform arbitration. Less hops may mean it takes less time for NMDs to communicate with each other and more hops may mean that it takes more time for NMDs to communicate with each other.

In some embodiments, the time interval may be a static value. In other embodiments, the time interval may be a dynamic value. For example, the time interval may be tuned based on a learning algorithm which balances needs of providing enough time to perform the arbitration and addressing latency concerns. The learning algorithm may initially choose a time interval (e.g., 20 ms) indicative of how long the NMD will wait before deciding whether to send the received voice command to the server. Then, the time interval may be increased (e.g., to 40 ms) if a "mistake" is detected by the server. The mistake may be that two or more NMDs separately send the voice command which follows the wakeword to the server. In this case, the server may notify the NMD to increase its time interval. The learning algorithm may be applied to the household, a group of NMDs, or a single NMD.

At 704, a measure of confidence may be determined for the detected voice input. The measure of confidence may indicate how well the wakeword was detected. The NMD may determine a characteristic associated with the detected wakeword. In one example, the characteristic may take the form of an audio envelope of the wakeword. The audio envelope may define an amplitude and/or a duration of a wakeword in a time domain. In another example, the characteristic may take the form of a frequency spectrum of the wakeword. The frequency spectrum may define frequency content of a wakeword in a frequency domain. The NMD may store and/or receive from the computing device 504-508 an ideal characteristic for each wakeword that the NMD might receive. The ideal characteristic may be, for example, the audio envelope, duration, or frequency spectrum of a wakeword when no noise is present. A characteristic of the detected wakeword may be compared to a corresponding ideal characteristic. A high degree of correlation between the characteristic of the detected wakeword and an ideal characteristic may indicate that the detected wakeword is likely the wakeword associated with the ideal characteristic. The NMD may identify the wakeword with the highest degree of correlation.

In some embodiments, the measure of confidence may be indicative of this correlation. The measure of confidence might be, for example, a number from 0 to 1 or 0 to 100. For example, a detection with no background noise may receive a value of 1 (in the 0 to 1 range) indicating a high degree of confidence that a specific wakeword was detected while a detection with a lot of distortion or noise might receive a 0.1 (in the 0 to 1 range) indicating a low degree of confidence that the specific wakeword was detected. For example, a detection with no background noise may receive a value of 100 (in the 0 to 100 range) indicating a high degree of confidence that a specific wakeword was detected while a detection with a lot of distortion or noise might receive a 10 (in the 0 to 100 range) indicating a low degree of confidence that the specific wakeword was detected. For example, a detection with no background noise may receive a value of 10 (in the 0 to 100 range) indicating a high degree of confidence that a specific wakeword was detected while a detection with a lot of distortion or noise might receive a 100 (in the 0 to 100 range) indicating a low degree of confidence that the specific wakeword was detected. For example, a detection with no background noise may receive a value of 0.1 (in the 0 to 1 range) indicating a high degree of confidence that a specific wakeword was detected while a detection with a lot of distortion or noise might receive a 1 (in the 0 to 1 range) indicating a low degree of confidence that the specific wakeword was detected. In some instances, the measure of confidence may correlate to a relative distance between the NMD and the speaker. Other arrangements are also possible.

In some embodiments, the NMD may generate an arbitration message which is sent to other NMDs on the communication means 546, e.g., in the household. Each NMD in the household that also detected the wakeword may send an arbitration message to the other NMDs in the household. Typically, the NMDs which detected the wakeword may be within an audible range of the voice input.

Figure 8:
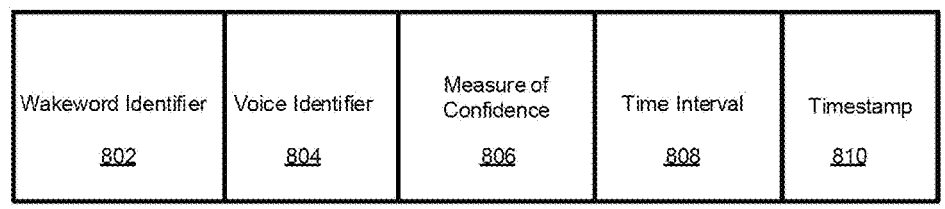
FIG. 8 shows an example arbitration message.

FIG. 8 illustrates an example of the arbitration message 800. The arbitration message 800 may identify one or more of a wakeword identifier 802, a voice identifier 804, measure of confidence 806, a time interval 808, and a time stamp 810. The arbitration message is illustrated as one message but may take the form of multiple messages and include more or less identifiers than represented by 802-810.

The household may support multiple wakewords. The wakeword identifier 802 may indicate which wakeword the NMD detected. For example, the wakeword identifier may indicate whether the NMD detected the wakeword "Alexa", "OK Google", "Hey Sonos", or "Hey Siri". The wakeword may take other forms as well.

Optionally, the arbitration message 800 may include a voice identifier 804. The voice identifier may identify the speaker of the wakeword. The identification may be who spoke the wakeword, e.g., Mary or Tom, whether the speaker was male or female, and/or whether the speaker was old or young. The NMD may learn, during a configuration process or be provided by a network device such as the server, a characteristic of each speaker that may use the NMD. The characteristic may help identify whether the wakeword was spoken by that speaker. For example, the characteristic might be a frequency spectrum of speech by the speaker. Then, when the NMD receives a wakeword, the NMD may determine whether the wakeword has the characteristic of the speaker. If the wakeword has the characteristic, then the voice identifier may identify the speaker associated with the characteristic, e.g., whether it is Mary or Tom who spoke the wakeword and/or whether it is a male or female who spoke the wakeword.

Additionally, or alternatively, the arbitration message 800 may include the measure of confidence 806 for the detected wakeword. The arbitration message may also identify the time interval 808 associated with how long the NMD will wait before sending the voice recording to the server. Including the time interval in the arbitration message may allow one NMD to learn what time interval another NMD is using. For example, one NMD may change its time interval based on that of another NMD. Additionally, the arbitration message may identify a timestamp 810 associated with the arbitration message. The timestamp may be used to identify retransmissions of arbitration messages, among other reasons.

At 706, an arbitration process based on one or more of the wakeword and the voice command may be performed to determine whether a voice input, e.g., the voice command that follows the wakeword or the wakeword and voice command, should be sent to one or more of computing device 504-508, e.g., a server. For example, the NMD may determine whether to send the voice command to the one or more computing devices based on the measure of confidence of the detected wakeword. For example, the NMD may determine whether to send the voice command to the one or more computing devices based on the received voice command (or portion thereof) and the measure of confidence of the detected wakeword. If the NMD does not send the voice command, then processing may end. If the NMD sends the voice command to the server, then the NMD may receive a response from the server. The response may be a voice response to the voice command that is to be played back by the NMD or another playback device. For example, a voice response may be "The next song will be Purple Rain" in response to the voice command "What is the next song in the playback queue?". The NMD may play the voice response. Further, if the audio played by the NMD is ducked or is to be ducked, then the NMD may mix the audio with the voice response for playback when the audio is ducked. In this regard, the NMD may duck audio in response to detecting a wakeword if it has sufficient processing power to perform mixing and pause audio if it does not have sufficient processing power to perform the mixing. Additionally, or alternatively, the response may be a command associated with control of a media playback device or system. Examples may include playing certain music content such as "When Doves Cry by Prince" indicated in the voice command or setting the volume of playback.

Figure 9:
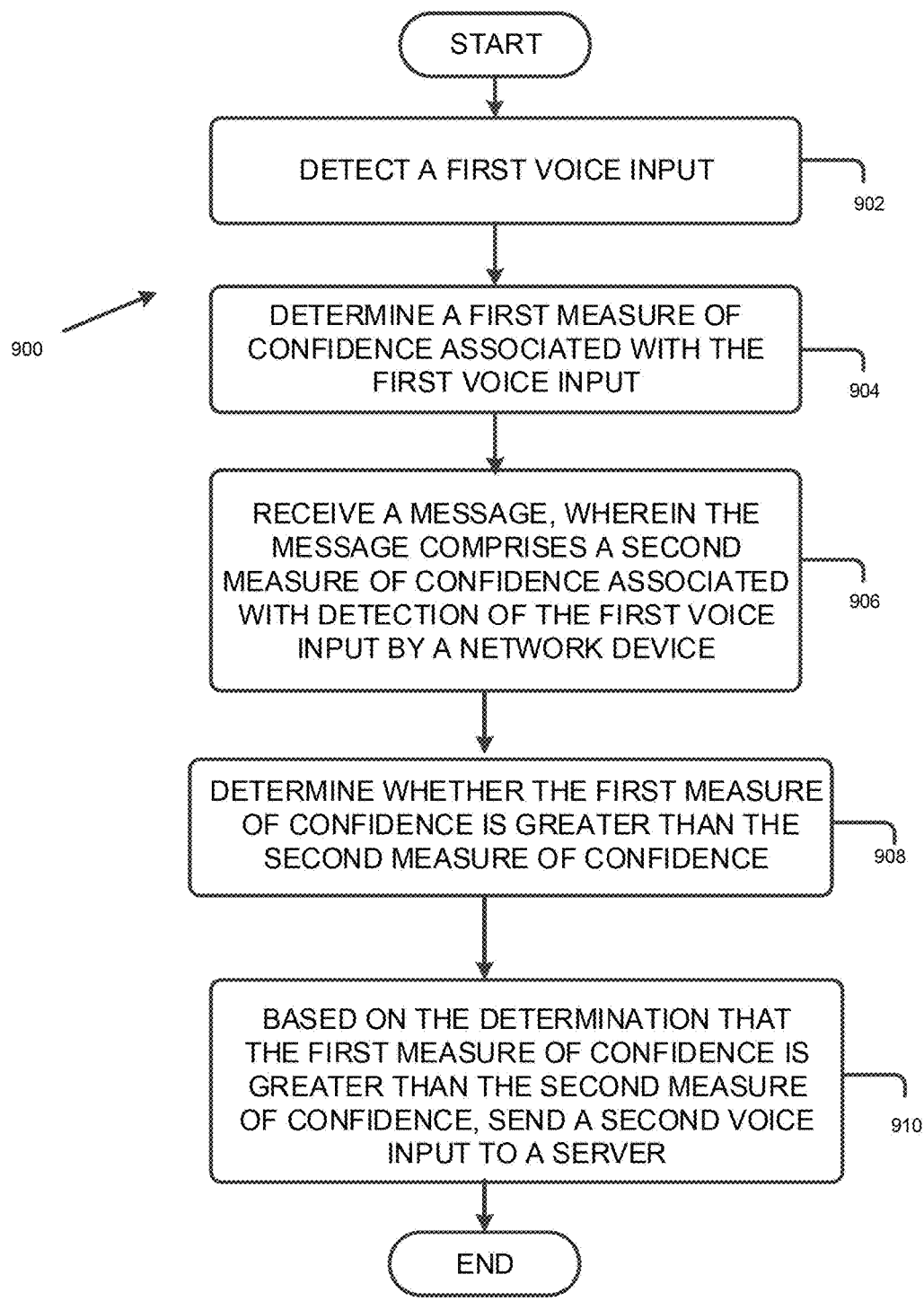
FIG. 9 shows a detailed flow diagram of functions associated with arbitration between network microphone devices in accordance with a first embodiment.

FIG. 9 shows a detailed flow diagram 900 of functions associated with the arbitration between one or more NMDs in accordance with a first embodiment. The first embodiment is based on an arbitration message being received from another NMD and a voice command being sent to a server based on the received arbitration message. The described functions may be performed by an NMD individually or in combination with the computing device 504-506, PBDs 532-538, NMDs 512-516, CR 522, or any other devices described herein.

At 902, a first voice input may be detected. The first voice input may be, for example, a wakeword. In some embodiments, the detection may trigger start of a time interval. At 904, a first measure of confidence associated with the first voice input may be determined. The measure of confidence may be how well the wakeword was detected. The first measure of confidence may be determined by the NMD itself. Additionally, or alternatively, the NMD may send the voice input to a computing device 504-508 or other network device and receive the measure of confidence from the computing device 504-508 or other network device.

At 906, a message may be received. The message may be an arbitration message sent from an NMD which detected the same wakeword. The message may comprise a second measure of confidence associated with detection of the first voice input.

In some embodiments, the NMD may also send an arbitration message which comprises the first measure of confidence associated with the first voice input to other NMDs. For example, the NMD may send an arbitration message to another NMD coupled to communication means 546. This way the other NMD, e.g., in a household, may perform arbitration as well based on the wakeword detected by the NMD.

At 908, a determination is made whether the first measure of confidence is greater than the second measure of confidence. If the first measure of confidence is greater than the second measure of confidence, then the NMD may win the arbitration. The greater measure of confidence indicates that the NMD may be in a better position to clearly receive the voice command which follows the wakeword.

The NMD may receive a plurality of arbitration messages from a plurality of NMDs during a time interval. The NMD may continue to compare the measure of confidence in each arbitration message to the measure of confidence associated with the detected first voice input until, for example, the time interval expires. So long as the measure of confidence of the detected first voice input is greater than the measure of confidence in any of the received arbitration messages, then the NMD may continue to win the arbitration.

In some embodiments, the NMD may wait for expiration of the time interval before performing any arbitration. At expiration of the time interval, the NMD may compare the measure of confidence associated with its detected wakeword with the measure of confidences indicated in the arbitration messages that have been received during the time interval. The NMD may determine whether the measure of confidence associated with its detected wakeword is the highest. Based on this determination, the NMD may send the second voice input to one or more of computing devices 504-508 at expiration of the time interval.

At 910, the second voice input may be sent to one or more of computing devices 504-508, e.g., server based on the determination that the first measure of confidence is greater than the second measure of confidence. In some embodiments, the second voice input may be a voice command that follows the first voice input, e.g., wakeword. In other embodiments, the second voice input may be the same as the first voice input to the extent that the first voice input is indicative of both a wakeword as well as a voice command. In yet other embodiments, the first voice input may also be sent with the second voice input to the one or more computing devices. The server may use the first voice input to arbitrate "in the cloud" as between two or more NMDs which send a voice command associated with a same wakeword to the server. The server may then determine which sent voice command to use for voice recognition.

The server may then send a response to the second voice input. The response may be a voice response which is played by the NMD or other network device or a command associated with control of a media playback device or system such as play certain music content or change a setting of the playback device.

Figure 10:
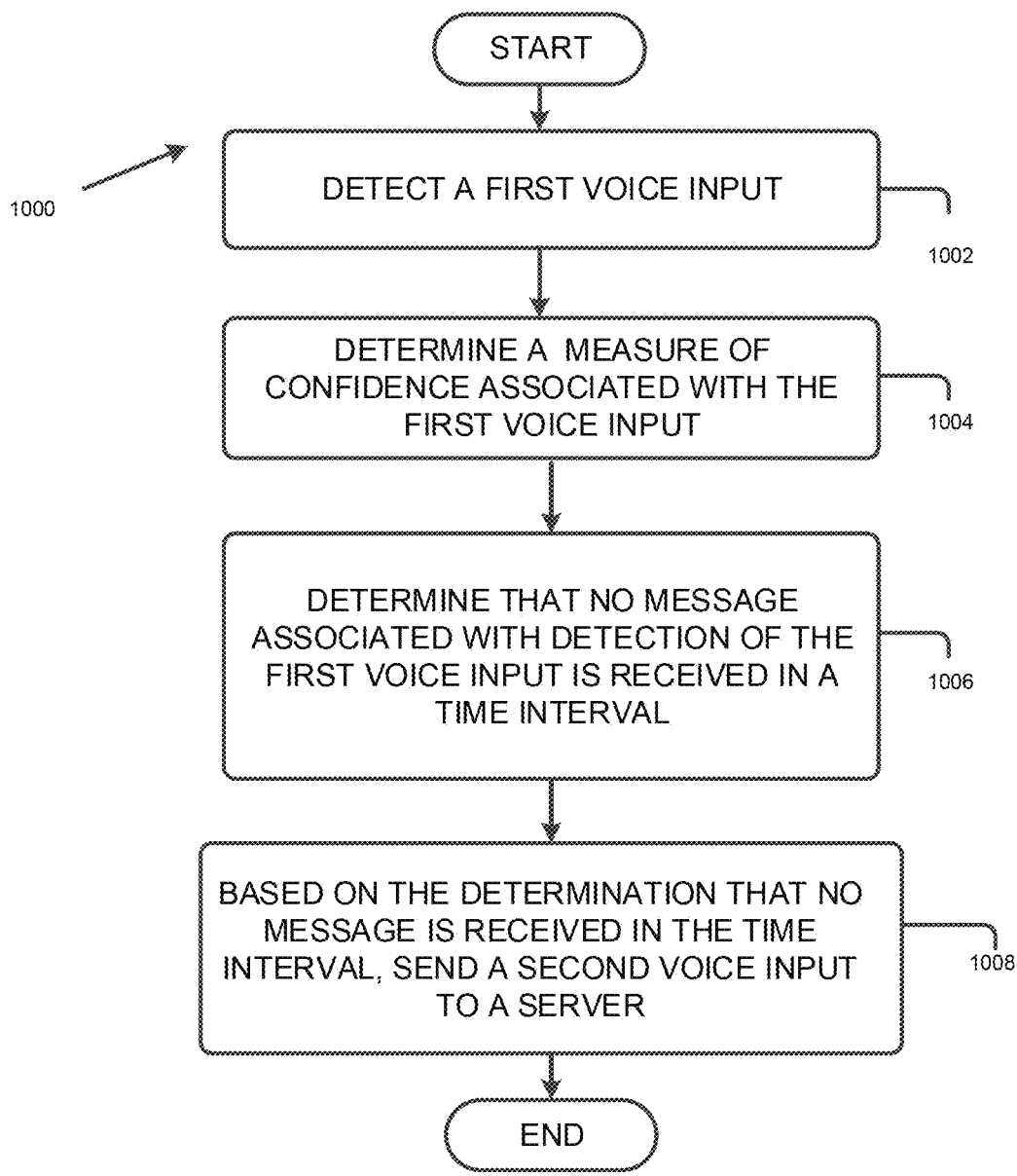
FIG. 10 shows a detailed flow diagram of functions associated with arbitration between network microphone devices in accordance with a second embodiment.

FIG. 10 shows a detailed flow diagram 1000 of functions associated with arbitration between network microphone devices in accordance with a second embodiment. The second embodiment illustrates a scenario where an arbitration message associated with detection of the wakeword is not received from any other NMD during a time interval and a voice command which follows a wakeword is sent to a server after the time interval expires. Again, the described functions may be performed by an NMD individually or in combination with the computing device 504-506, PBDs 532-538, NMDs 512-516, CR 522, or any other devices described herein.

At 1002, a first voice input may be detected. The first voice input may be, for example, a wakeword. The detection may trigger the start of a time interval. At 1004, a measure of confidence associated with the first voice input may be determined. The measure of confidence may be determined by the NMD itself. Additionally, or alternatively, the NMD may send the voice input to a computing device 504-508 or other network device and then receive the measure of confidence from the computing device 504-508 or other network device.

In some embodiments, a message, e.g., arbitration message, may be sent which comprises the first measure of confidence associated with the first voice input. For example, the NMD may send the arbitration message to other NMDs coupled to communication means 546, e.g., in a household. At 1006, a determination may be made that no message associated with detection of the first input by another NMD is received in the time interval. For example, the NMD may determine that it received no arbitration message from any other NMDs on the communication means 546. At 1008, based on the determination that no message is received, a second voice input may be sent to one or more of computing devices 504-508, e.g., server. The second voice input may be a voice command that the NMD received and which followed the voice input in the form of the wakeword.

The server may send a response to the second voice input. For example, the NMD which sent the second voice input may receive the response to the second voice input. The response may be a voice response to a request for information which is played by the NMD or other network device. Additionally, or alternatively, the response may be a command associated with control of a media playback device or system such as play certain music content or change a setting of the playback device. The NMD or another network device may perform the command defined by the response.

Figure 11:
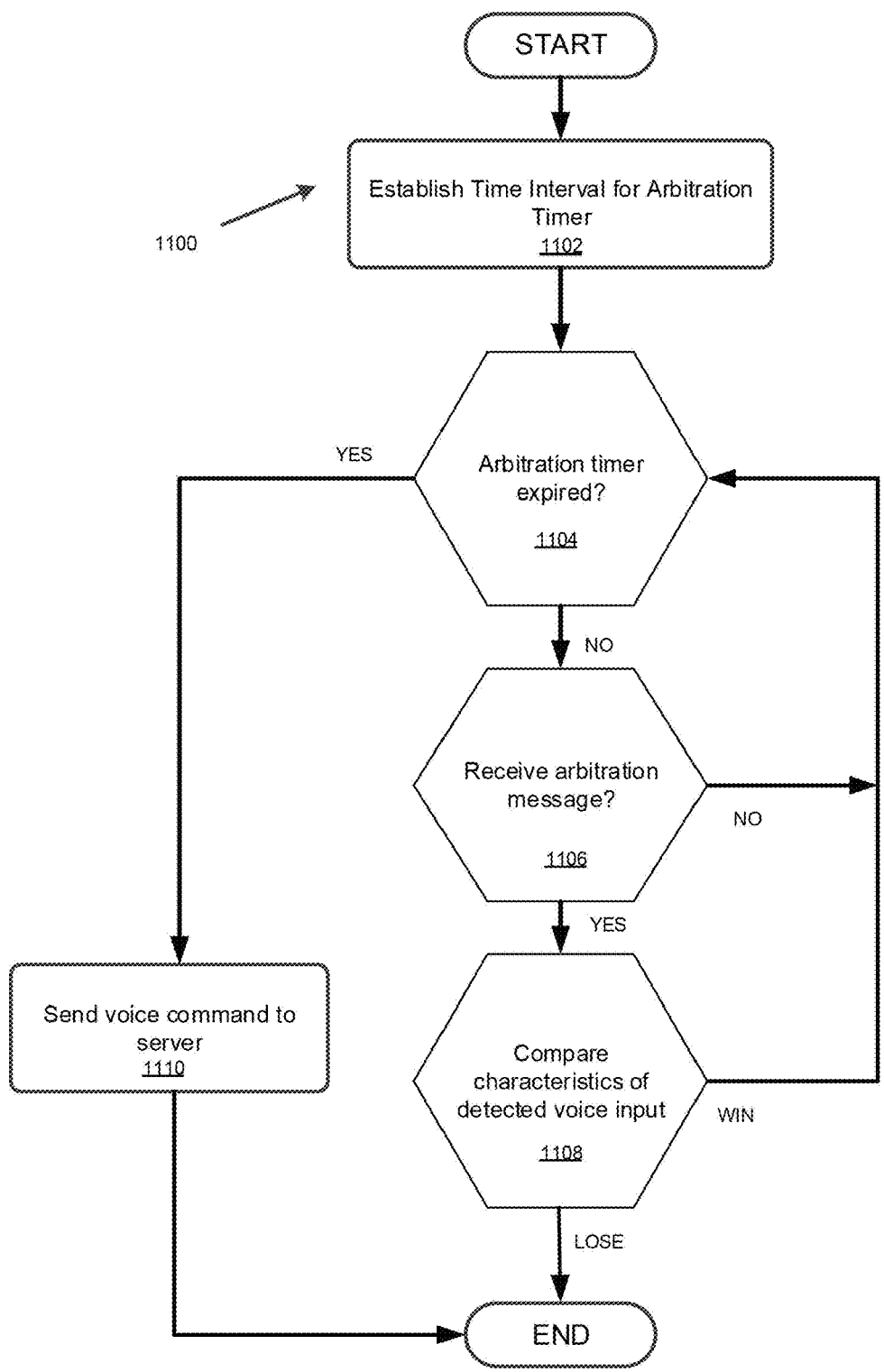
FIG. 11 shows a flow diagram of arbitration functions.

FIG. 11 is a flow chart 1100 which describes in more detail the functions associated with the arbitration process at 706 of FIG. 7. The described functions may be performed by an NMD individually or in combination with the computing device 504-506, PBDs 532-538, NMDs 512-516, CR 522, or any other devices described herein.

At 1102, the NMD may establish a time interval for an arbitration timer. The arbitration timer may be a clock-based timer. The arbitration timer may be initially set to a time interval indicative of how long the NMD should wait before sending a voice command which follows the wakeword to one or more of the computing devices, e.g., server. The length of time may be a configurable parameter, such as 0 to 100 ms. The time interval may be set in a manner so as to quickly arbitrate between NMDs without adding much latency to voice recognition.

At 1104, a determination is made whether the arbitration timer has expired. If the arbitration timer has not expired, then processing continues at 1106 to determine whether an arbitration message is received. The arbitration message may be message from another NMD which detected the same wakeword. If an arbitration message is not received, then processing may return back to 1104 to determine whether the arbitration timer expired. If an arbitration message is received, then at 1108, the NMD may compare characteristics of the voice input, e.g., wakeword, that it detected with the characteristics of the wakeword detected by the NMD which sent the arbitration message.

For example, the NMD may compare the measure of confidence of the wakeword it detected to the measure of confidence in the arbitration message that it received. For example, the NMD may compare the voice identifier of the wakeword it detected to the voice identifier in the arbitration message that it received. For example, the NMD may compare the wakeword identifier of the wakeword it detected to the wakeword indicator in the arbitration message that it received.

The NMD may determine whether it "wins" or "loses" the arbitration with the other NMD based on the comparison.

The NMD may win the arbitration based on one or more of the following determinations: (i) the measure of confidence determined by the NMD is larger than that associated with the received arbitration message; (ii) the voice identifier determined by the NMD is different from the voice identifier associated with the received arbitration message; (ii) the wakeword detected by the NMD is different from the wakeword identified in the received arbitration message. The NMD may win based on other criteria as well.

The NMD may lose the arbitration if the measure of confidence determined by the NMD is less than that associated with the received arbitration message for the same detected wakeword. If the NMD supports voice identification and the arbitration message also indicate a voice identifier, the NMD may lose the arbitration if the measure of confidence determined by the NMD is less than that associated with the received arbitration message for the same voice identifier and same detected wakeword. The NMD may lose based on other criteria as well.

If the NMD wins the arbitration, then processing may return to 1104. If the NMD loses the arbitration, then at 1108, the arbitration may terminate. The audio played back by the NMD may have been adjusted, e.g., ducked or paused, when a wakeword was detected so as to better receive the voice command which follows the wakeword. If the NMD loses the arbitration, then the NMD may adjust the audio back to where the audio was before the wakeword was detected and the audio was adjusted. For example, if the audio was paused, the audio may be unpaused, e.g., audio playback may continue from where it was stopped. For example, if the audio was ducked, then the audio may be unducked, e.g., the volume of the audio may be increased. For example, if the audio was ducked, the audio may be returned to a point in the audio prior to ducking. The NMD may store a position in the audio, e.g., time stamp, where the audio is ducked. Upon losing the arbitration, the audio may begin playback at the position in the audio, e.g., timestamp, where the audio was ducked. Other arrangements are also possible.

In yet another embodiment, if the NMD loses the arbitration, then the NMD may not adjust its audio to a level, e.g., volume, where it was before being adjusted until it receives a notification. In a first example, the notification may take the form of a message from the NMD which wins the arbitration. In a second example, the notification may take the form of a message from another playback device (or NMD) which is in a bonded zone with the NMD. The other playback device may be playing audio in synchrony with the NMD, win arbitration, provide the voice command to the server, and then send the notification to the NMD to adjust the audio back when voice recognition is complete. In a third example, the notification may take the form of presence or absence of a signal that is transmitted by the NMD which may have won arbitration. The signal may be output by the NMD via the speakers. For example, the signal may be outside a frequency range of music, e.g., outside a 20 Hz to 20 KHz frequency range, but still within an audible by the microphone of the NMD. Presence of this signal may indicate that the NMD should adjust the audio to a level where it was before a wakeword was detected. Alternatively, absence of this signal may indicate that the NMD should adjust the audio to a level where it was before a wakeword was detected. The notification may take other forms as well, such as Universal Plug and Play (UPnP) control requests.

If at 1104, the time interval expires, then at 1110 the NMD may send the received voice command to the server. The time interval may expire if the NMD continues to win arbitrations. Alternatively, the time interval may expire if the NMD does not receive any arbitration message associated with detection of the wakeword from any other NMD before the time interval expires. In embodiments, the voice command may be sent to the server by streaming the voice command to the server.

Figure 12:
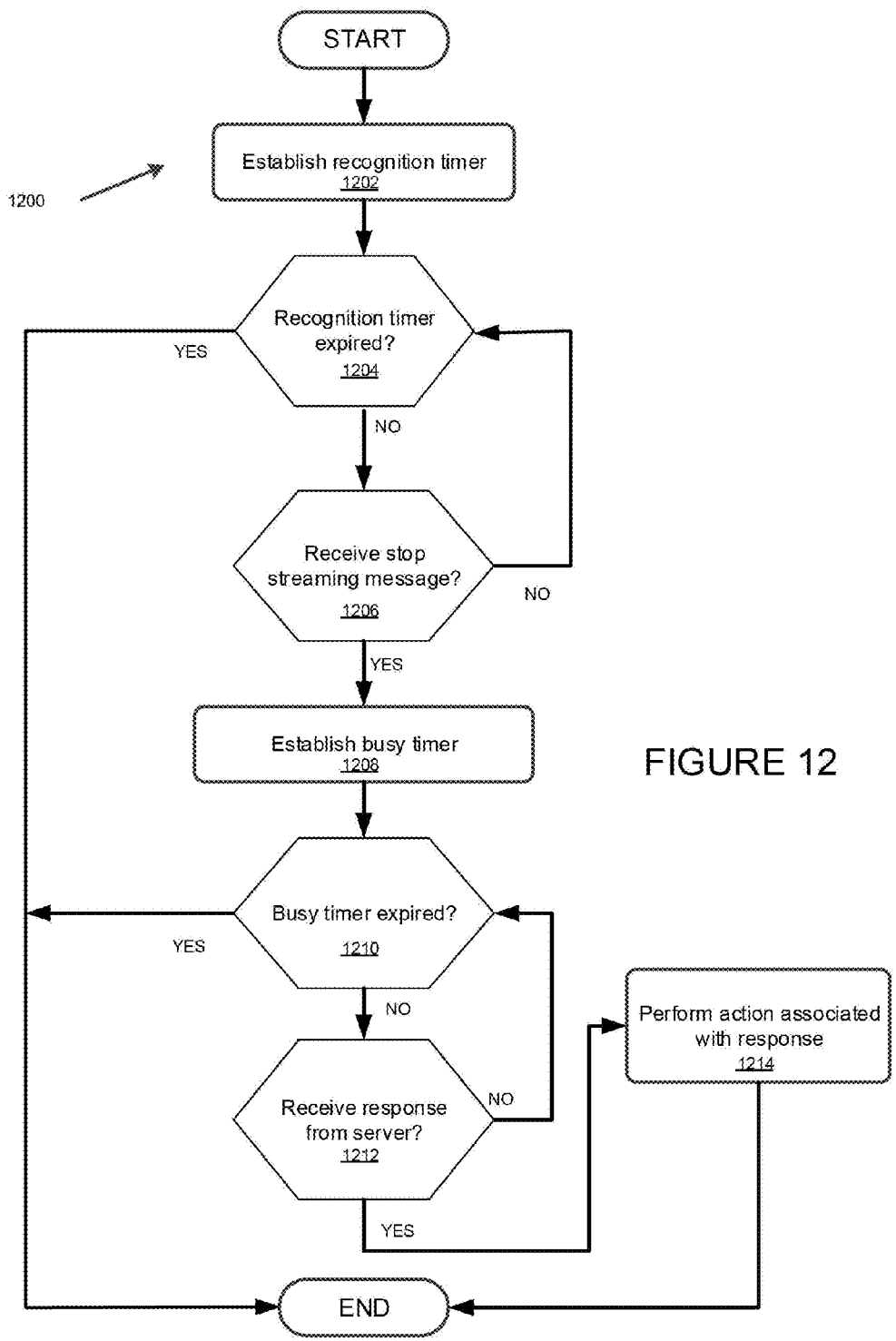
FIG. 12 shows a flow diagram associated with voice recognition between a network microphone device and a server.

FIG. 12 a flow diagram associated with voice recognition of the voice command as between a network microphone device and a computing device, e.g., server. The described functions may be performed by an NMD in combination with the computing device 504-506, PBDs 532-538, NMDs 512-516, CR 522, or any other devices described herein.

At 1202, a recognition timer may be established. The recognition timer may be a clock-based timer which defines a duration for which the NMD may send (e.g., stream) the voice command that the NMD receives to the server. For example, the duration may be set to 5-10 seconds and used to recover in the extent that the server does not notify the NMD to stop sending the voice command. The server may not notify the NMD to stop sending due to a communication problem over the communications means 546 or if the server fails to inform the NMD that the server decided to process the voice command received by another NMD. At 1204, a determination is made whether the recognition timer expires. If the recognition timer expires, then, the streaming of the voice command terminates. In some embodiments, the streaming of the voice command may also terminate if the server sends an abort message to terminate the voice command streaming. The abort message may indicate that another NMD won arbitration.

If the recovery timer does not expire, then at 1206, the NMD may determine whether the server sent an indication to stop the streaming of the voice command. If the server did not send an indication to stop the streaming of the voice command, then processing may return to 1204 to determine if the recognition timer expired. If the server sent an indication to stop the streaming of the voice command, then at 1208 the NMD may establish a busy timer. The busy timer may indicate a time duration by which the server is to send a response to the voice command that followed the wakeword after the NMD sent the voice command.

The server may be cloud-based server system. The server may perform voice recognition on the voice command. For example, the server may convert the voice command to text, interpret the text, and then formulate a response based on the text. At 1210, expiration of the busy timer is checked. If the busy timer is not expired, then at 1212, the NMD checks to see if the response is received. The response may take a variety of forms.

In one example, if the voice command is a request for information, then the response may be a voice response. The voice response may be the requested information which is sent to the NMD in the form of text and converted to a voice response that is audibly played back by the NMD. For example, the voice response may be "The weather sunny" in response to a voice command querying "What is the weather?". Further, the voice response may be mixed with the audio being played back by the NMD in the case when the NMD is also playing back audio. If the audio is paused, then the voice response may be played back alone.

In another example, the voice response may be an indication that the voice command was not understood. For example, the voice response may be "I did not understand the command." The voice response may take other forms as well.

Additionally, or alternatively, the response may be a command associated with control of a media playback device or system such as play certain music content or change a setting of the playback device. The server may send the command to the NMD and the NMD may perform the command or instruct another network device to perform the command. For example, the command may be for the NMD to play certain audio content or change a setting of the playback device. If a command is received, then the NMD may perform the command or instruct another network device to perform the command.

The response may take other forms as well, including a response in the form of text which is displayed on the control device 300. Other arrangements are also possible.

At 1214, an action is performed associated with the response, e.g., play the voice response or perform the command. If no response is received from the server, then processing returns to 1210. If the busy timer expires with no response received, then the processing may terminate.

While the server is processing the voice command, the NMD may not be arranged to detect any additional wakewords. However, the NMD may receive additional voice input as a result of playing a voice response. The server may provide an indication to the NMD that the voice response will result in additional voice input. The NMD may establish a timer to wait for the additional voice input. For example, the additional voice input may be an audio signal with an average amplitude which exceeds a threshold level. If the NMD detects an audio signal above a threshold level, then the NMD may receive the additional voice input and stream the voice input to the server, at which point, the server may provide a response to the NMD. The response may be processed as a voice command in the manner described herein. If the additional voice input is not received before the timer expires, the NMD may stop receiving the voice input and terminate processing.

In some embodiments, arbitration may be performed by a centralized device rather than being performed locally at each NMD. The centralized device may be a designed NMD or network device connected to the communication means 546, e.g., in a household, making a determination of which NMD which detected a wakeword should send the voice command following the wakeword to the server. In this regard, the centralized device may receive an arbitration message from the one or more NMDs and identify based on the measure of confidence associated with the arbitration message which NMD should send its received voice command to the cloud-based computing device. For example, the centralized device may determine which NMD detected the wakeword with a highest measure of confidence. The centralized device may then cause the identified NMD to send its received voice command to the computing device.

NMDs may have received a voice command with a sufficiently high measure of confidence that providing the voice command to the computing device would assist in performing reliable voice recognition. Accordingly, in some embodiments, the voice command received by NMDs which did not win an arbitration may also be sent to the computing device to improve reliability in voice recognition of the voice command. The received voice command sent may be those having a measure of confidence that exceeds a threshold level. The NMD which wins arbitration may notify those NMDs to send its received voice command to the server if the measure of confidence exceeds the threshold level. The multiple versions of the voice command may facilitate reliable voice recognition.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method comprising:
    detecting, with a first network device that comprises a first microphone device (NMD) that is configured to perform audio playback of a first audio channel of audio content, a voice input;
    determining, by the first NMD, a first measure of confidence associated with the voice input;
    transmitting a message to a second network device that is configured to perform audio playback of a second audio channel of the audio content in synchrony with the first audio channel,
    wherein the message comprises the first measure of confidence and the voice input detected with the first NMD;
    receiving, from the first NMD and by the second network device, the message comprising the first measure of confidence and the voice input detected with the first NMD;
    after receiving the message, determining, by the second network device, that the first measure of confidence is greater than a second measure of confidence, wherein the second measure of confidence is associated with a voice input that has been detected by a second NMD; and
    causing the second NMD to perform voice recognition based on the voice input detected with the first NMD.

2. The method of claim 1, further comprising sending, by the second network device, the voice input detected by the first NMD to a server after determining that the first measure of confidence is greater than the second measure of confidence.

3. The method of claim 1, further comprising receiving a voice response to the voice input detected with the first NMD from a server and audibly playing the voice response.

4. The method of claim 1, wherein the message is a first message comprising the voice input detected with the first network device, the method further comprising sending a second message which comprises the first measure of the confidence associated with the voice input detected with the first network device to the second network device.

5. The method of claim 1, comprising:
    detecting the voice input via a microphone of a third network device, wherein the third network device comprising the second NMD.

6. The method of claim 1, wherein the first measure of confidence and the second measure of confidence are based on at least one of:
    an audio envelope of a wakeword of the voice input, or
    a frequency spectrum content of a wakeword of the voice input.

7. The method of claim 1,
    wherein the first NMD is configured to playback a left audio channel of the audio content, and the second network device is configured to playback a right audio channel of the audio content, and wherein the first NMD and the second network device form a stereo pair.

8. The method of claim 7, further comprising:
    sending, by the second network device, and to the first network device, information associated with the right audio channel to enable the first device to playback the audio content in synchrony with the second audio device.

9. A system comprising a first network device and a second network device communicatively coupled to the first network device over a network, wherein:
    the first network device comprises a first network microphone device (NMD), wherein the first NMD comprises at least one processor and tangible, non-transitory computer-readable memory comprising instructions that, when executed, cause the first NMD to perform first operations comprising:
        performing audio playback of a first audio channel of audio content;
        detecting a voice input;
        determining a first measure of confidence associated with the voice input detected by the first network device; and
        transmitting a message to the second network device, wherein the message comprises the first measure of confidence and the voice input detected with the first network device; and
    the second network device comprises at least one processor and tangible, non-transitory computer-readable memory comprising instructions that, when executed, cause the second network device to perform second operations comprising:
        performing audio playback of a second audio channel of the audio content in synchrony with the first audio channel;
        receiving from the first NMD the message comprising the first measure of confidence and the voice input detected with the first network device;
        after receiving the message, determining that the first measure of confidence is greater than a second measure of confidence, wherein the second measure of confidence is associated with a voice input that has been detected by a second NMD; and
        based on the determination that the first measure of confidence is greater than the second measure of confidence, causing the second network device to perform voice recognition based on the voice input detected at the first NMD device.

10. The system of claim 9, wherein the message is a first message comprising the voice input detected with the first NMD, the first operations comprising sending to the second network device a second message which comprises the first measure of the confidence associated with the detected first voice input.

11. The system of claim 9, wherein the second operations comprise: waiting for expiration of a timer before sending the voice input to a server.

12. The system of claim 9, wherein the first operations further comprise:
    receiving a voice response to the voice input from a server and audibly playing the voice response.

13. The system of claim 9, wherein the second network device comprises the second NMD, and wherein the second operations further comprise detecting the voice input via a microphone of the second NMD.

14. The system of claim 9, comprising:
    a third network device comprising the second NMD, wherein the third network device comprises at least one processor and tangible, non-transitory computer-readable memory comprising instructions that, when executed, cause the third network device to perform third operations comprising:
  detecting the voice input via a microphone of the third NMD.

15. The system of claim 9, wherein the first measure of confidence and the second measure of confidence are based on at least one of:
  an audio envelope of a wakeword of the voice input, or
  a frequency spectrum content of a wakeword of the voice input.

16. The system of claim 9, wherein the second network device comprises the second NMD, and wherein the second operations further comprise detecting the voice input via a microphone of the second NMD.

17. The system of claim 9,
  wherein performing audio playback of the audio content, by the first network device, of the first audio channel comprises performing audio playback of a left audio channel of the audio content,
  wherein performing audio playback of the second audio channel comprises performing audio playback, by the second network device, of a right audio channel of the audio content, and
  wherein the first network device and the second network device form a stereo pair.

18. The system of claim 17, wherein the second operations further comprise
  sending, by the second network device, and to the first network device, information associated with the right audio channel to enable the first device to playback the audio content in synchrony with the second audio device.

19. The system of claim 9, further comprising:
  a third network device comprising a second NMD, wherein the second NMD comprises at least one processor and tangible non-transitory computer-readable memory comprising instructions that, when executed, cause the third network device to perform third operations comprising:
  detecting the voice input via a microphone of the second NMD; and
  determining a third measure of confidence associated with the voice input detected via the microphone of the second NMD: and
  transmitting a message to the second network device, wherein the message comprises the third measure of confidence and the voice input detected with the third network device.

20. The system of claim 19,
  wherein the voice input detected at the first network device is associated with the first measure of confidence, wherein the voice input detected at the second network device is associated with the second measure of confidence, and wherein the voice input detected at the third network device is associated with the third measure of confidence
wherein the second operations comprising determining that the first measure of confidence is greater than the second measure of confidence comprises performing operations further comprise performing second operations comprising:
  determining which of the first measure of confidence, the second measure of confidence, and the third measure of confidence is greatest; and
  performing voice recognition based on the respective voice input associated with the determined greatest measure of confidence.

* * * * *